US012599939B2

(12) United States Patent
McFarland et al.

(10) Patent No.: US 12,599,939 B2
(45) Date of Patent: Apr. 14, 2026

(54) SELF-CLEANING SAFETY SYSTEM

(71) Applicant: Microchip Technology Incorporated, Chandler, AZ (US)

(72) Inventors: Patrick McFarland, Gilbert, AZ (US); Arthur Eck, Gilbert, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 125 days.

(21) Appl. No.: 18/410,228

(22) Filed: Jan. 11, 2024

(65) Prior Publication Data

US 2024/0253090 A1 Aug. 1, 2024

Related U.S. Application Data

(60) Provisional application No. 63/441,341, filed on Jan. 26, 2023.

(51) Int. Cl.
*B08B 13/00* (2006.01)
*B08B 5/02* (2006.01)
*B08B 6/00* (2006.01)
*B08B 7/02* (2006.01)

(52) U.S. Cl.
CPC ................ *B08B 7/026* (2013.01); *B08B 5/02* (2013.01); *B08B 6/00* (2013.01)

(58) Field of Classification Search
None
See application file for complete search history.

(56) References Cited

U.S. PATENT DOCUMENTS 10,839,661 B2 11/2020 Eck

FOREIGN PATENT DOCUMENTS

| | | | | |
|---|---|---|---|---|
| CN | 209785201 U | 12/2019 | | G08B 17/06 |
| CN | 213876983 U | 8/2021 | | B08B 5/02 |
| EP | 1777670 B1 | 4/2007 | | F16P 3/14 |
| EP | 1898377 A1 | 3/2008 | | G08B 29/12 |
| EP | 2073178 A1 | 6/2009 | | G08B 29/12 |
| JP | 2013171364 A | 9/2013 | | G01N 21/53 |
| JP | 5438294 B2 | 3/2014 | | G08B 17/107 |
| JP | 2016020861 A | 2/2016 | | G01S 15/50 |

OTHER PUBLICATIONS

Google Patents translation of EP1777670 (Year: 2025).*
Google Patents translation of EP2073178 (Year: 2025).*
Google Patents translation of JP2013171364 (Year: 2025).*
International Search Report and Written Opinion, Application No. PCT/US2024/013067, 22 pages, Sep. 26, 2022.
Partial International Search Report and Written Opinion, Application No. PCT/US2024/013067, 13 pages, Jun. 12, 2024.

* cited by examiner

*Primary Examiner* — Eric W Golightly
(74) *Attorney, Agent, or Firm* — SLAYDEN GRUBERT BEARD PLLC

(57) ABSTRACT

An apparatus includes a control circuit to connect to an audio device of a safety system. The safety system is to detect a hazardous condition. The audio device is to alert a user of the hazardous condition. The safety system is to include a sensor to sense the hazardous condition. The apparatus includes an interface to connect the control circuit to the audio device. The control circuit is to determine whether to clean a housing of the sensor and, based on a determination to clean the housing of sensor, cause the audio device to vibrate or issue sound waves at an inaudible frequency.

20 Claims, 5 Drawing Sheets

SELF-CLEANING SAFETY SYSTEM

PRIORITY

This application claims priority to U.S. Provisional Application No. 63/441,341 filed Jan. 26, 2023, the entire contents of which is incorporated herein by reference.

TECHNICAL FIELD

The present disclosure relates to safety devices such as smoke alarms and, more particularly, to a self-cleaning safety system.

BACKGROUND

Inventors of examples of the present disclosure have discovered that a lack of cleaning of safety devices, such as smoke and carbon monoxide detectors, may account for a significant percentage of failures to alarm during an emergency. In the case of smoke detectors, this failure to alarm due to lack of cleaning has increased over the past decade. This is especially prominent with hardwired safety devices, likely due to a lack of maintenance from not needing to regularly replace batteries. The failure of a safety device to alarm is a significant hazard, and in the case of dirty smoke detectors, results in numerous preventable deaths and injuries each year, as well as substantial property damage.

Other solutions for cleaning a safety device may measure a change in a baseline signal. The baseline signal may be provided, for example, during initial calibration of the safety device and may be recorded in safety device memory. During operation, the safety device may compare measured signals against the baseline signal to determine any drift of the baseline signal that would indicate a hazardous condition. The baseline signal will degrade over time due to debris. Some solutions may then adjust the baseline signal by some factor to keep it within an acceptable range for hazardous condition detection. Inventors of examples of the present disclosure have discovered that, while this approach might work in theory, in practice it is not sufficient due to quickly running out of headroom, which is the difference between a normal state and an alarm state, over time. This is evidenced by the significant and increasing number of smoke alarm failures over time, despite improving technology and safety standards.

Inventors of examples of the present disclosure have discovered that other solutions fail to effectively address the problem of the build-up itself of contaminants on the housing and lack routine maintenance. Inventors of examples of the present disclosure have identified that other solutions have been focused on detection of the dust and debris and an internal compensation applied to the alarm sensitivity. Inventors of examples of the present disclosure have identified that other solutions would sound a warning or fault signal when the detected dust and debris surpassed a certain preset level. Inventors of examples of the present disclosure have discovered that none of these solutions have addressed the actual issue of accumulation itself.

Examples of the present disclosure may address one or more of these issues.

DETAILED DESCRIPTION

Figure 1:
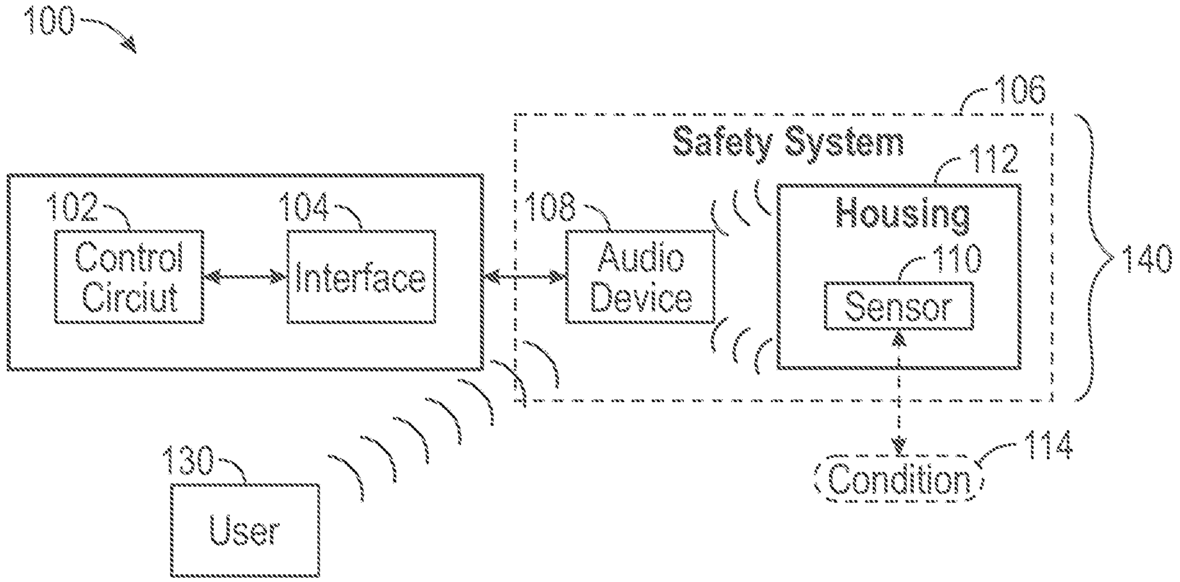
FIG. 1 is an illustration of an apparatus to control operation of an example self-cleaning safety system, according to examples of the present disclosure.

FIG. 1 is an illustration of an apparatus 100 to control operation of an example self-cleaning safety system 106, according to examples of the present disclosure. Apparatus 100 may be included in, or may be separate from, self-cleaning safety system 106. If separate from self-cleaning safety system 106, apparatus 100 may be communicatively connected to self-cleaning safety system 106 in any suitable manner, such as by wires, communication lines, pins, busses, or a wireless communication protocol. If apparatus 100 is included in self-cleaning safety system 106, self-cleaning safety system 106 may be referred to instead as self-cleaning safety system 140, though in the present disclosure self-cleaning safety system 106 will be referred to with the implication that self-cleaning safety system 106 may include apparatus 100.

Apparatus 100 may include a control circuit 102. Control circuit 102 may be configured to control cleaning of safety system housing 112, as well as the cleaning of any components therein or attached thereto in self-cleaning safety system 106.

Self-cleaning safety system 106 may include any suitable safety system, such as a smoke detector, carbon monoxide (CO) detector, radon detector, heat detector, or any suitable combination thereof.

Self-cleaning safety system 106 may include a sensor 110. Sensor 110 may be implemented in any suitable manner and may be configured to detect any suitable physical phenomena or condition 114. Sensor 110 may detect, for example, smoke, heat, CO, or radon, and may provide any suitable signal to a monitor circuit (not shown) to indicate a level of physical phenomena or condition 114 detected by sensor 110. In various examples, the monitor circuit may be implemented within control circuit 102, or separately. The monitor circuit may be configured to, based upon the signal provided from sensor 112, take any suitable corrective action such as alerting one or more users 130 through an audio device, discussed below.

Self-cleaning safety system 100 may include an audio device 108. Audio device 108 may be configured to provide an audible sound to users 130 based upon control signals from the monitor circuit based upon a level of physical phenomena or condition 114 detected by sensor 110. Audio device 108 may be implemented in any suitable manner, such as by a speaker, horn, alarm, or piezoelectric horn or device. Audio device 108 may be configured to oscillate at an audible frequency to alert one or more users 130. Furthermore, audio device 108 may be configured to generate sound waves at an audible frequency to alert one or more users 130. Audio device 108 may produce a high decibel sound as an alarm, e.g., a sound at 65 to 120 decibels (dB) when measured at a distance of 10 feet from the audio device 108, that can be heard even when far away from self-cleaning safety system 106, or by users who are asleep. This high decibel sound may sometimes be used to indicate an alarm fault condition or a need for testing. In various examples, audio device 108 may also be used to clean parts of self-cleaning safety system 106.

Self-cleaning safety system 106 may include a safety system housing 112. Safety system housing 112 may be implemented in any suitable manner to house or hold sensor 110. Moreover, safety system housing 110 may be configured to hold any other suitable portion of self-cleaning safety system 106 or apparatus 100 shown in the figures of the present disclosure. Safety system housing 112 may include grating, gills, or other openings so that sensor 110 may perceive physical phenomena or condition 114. Safety system housing 112 may accumulate dust, debris, particles, or any other substance that may interfere with the detection of physical phenomena or condition 114 by sensor 110. A surface of safety system housing 112 may be made with non-stick coating so as to facilitate cleaning.

Apparatus 100 may include an interface 104 by which control circuit 102 can access elements of self-cleaning safety system 106 such as audio device 108. Interface 104 may include any suitable mechanism by which control circuit 102 may access elements of self-cleaning safety system 106, such as pins, wires, busses, vias, electrical pathways, or any other suitable mechanism for transferring signals.

Control circuit 102 may be configured to cause audio device 108 to clean safety system housing 112. Control circuit 102 may be configured to cause audio device 108 to clean safety system housing 112 to cause dust or other particulate to be dissipated from physical surfaces of safety system housing 112. Control circuit 102 may actuate audio device 108 to vibrate at an inaudible frequency, or issue sound waves at an inaudible frequency, so as to clean safety system housing 112.

Control circuit 102 may be configured to determine to cause cleaning of safety system housing 112 on any suitable basis. Such cleaning may be performed, for example, periodically, on-demand by a user, or based upon a detection of debris. Control circuit 102 may, based on a determination to clean safety system housing 112, cause audio device 108 to vibrate, or issue sound waves, at an inaudible frequency. Operation of audio device 108 is operated to vibrate, or issue sound waves, at an inaudible frequency, may be considered operation of audio device 108 in a cleaning mode. The vibrations of, or sound waves issued by, audio device 108 may be at a frequency lower than the range of audible frequencies, at a frequency higher than the range of audible frequencies, or at a frequency higher and at a frequency lower than the range of audible frequencies, subsequent to one another, without requirement of order. The vibrations of, or sound waves issued, by audio device 108 at both a frequency lower than the range of audible frequencies and at a frequency higher than the range of audible frequencies may provide more effective cleaning than either frequency alone.

The cleaning of safety system housing 112 may be based on fixed intervals, or based on a duration operation, that may be adjusted based on whether self-cleaning safety system 106 is, for example, hardwired or battery operated. The cleaning of safety system housing 112 may be performed more frequently if self-cleaning safety system 106 is hardwired with an external power source.

Moreover, in some examples, the driving of audio device 108 in order to perform cleaning of safety system housing 112 may be performed in conjunction with periodic audio device fault detection by measuring the voltage in feedback from audio device 108. Control circuit 102, or another suitable part of apparatus 100, may evaluate the voltage feedback and ensure that the voltage feedback is within a normal range. Abnormal feedback ranges could indicate a fault and, as a result, an early warning may be sent to a user.

Control circuit 102, and any other monitor circuits, may be implemented in any suitable manner, such as by an application specific integrated circuit (ASIC), field programmable gate array (FPGA), programmable logic device (PLD), reprogrammable logic or hardware, analog circuitry, digital circuitry, digital logic, microcontroller, or instructions for execution by a processor, or any suitable combination thereof.

In various examples, multiple instances of audio device 108 may be used to generate vibrations or sound waves. In other examples, multiple instances of audio devices 108, such as horns, may be used wherein each audio device 108 may generate a different vibration or sound wave frequency. In some examples, audio device 108 or other elements for cleaning safety system housing 112 may be placed within a base of self-cleaning safety system 106, such as a piece that mounts safety system housing 112 to a surface such as a wall or ceiling. In some examples, a non-stick coating, such as Teflon, may be applied to safety system housing 112 so as to allow the vibrations to more easily remove the dust and debris.

Figure 2:
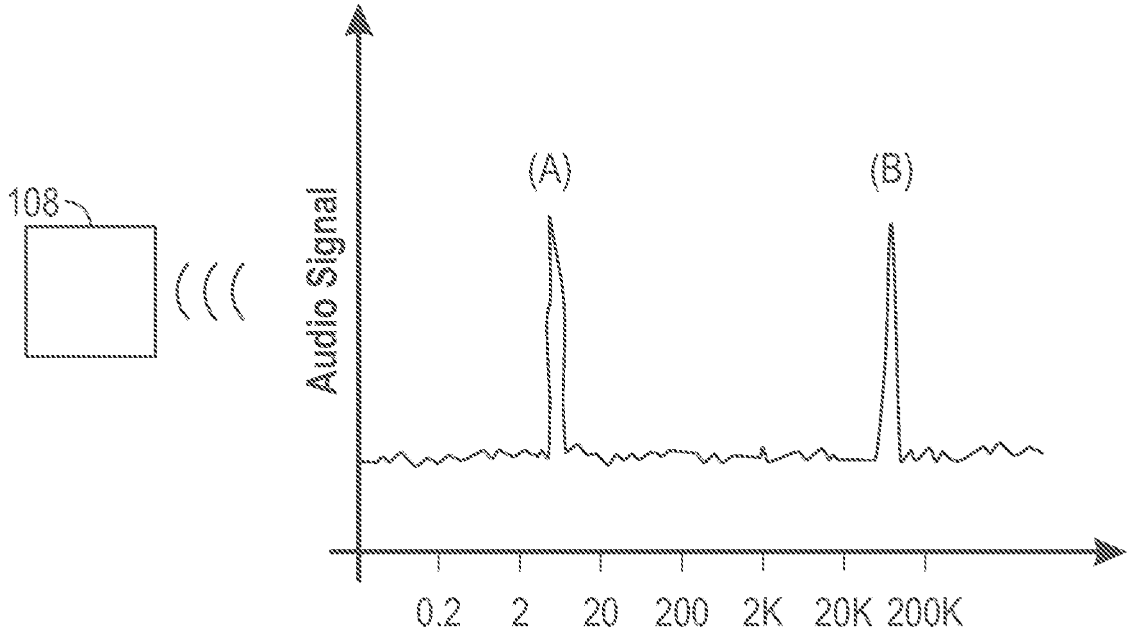
FIG. 2 is an illustration of operation of an apparatus to control operation of an example self-cleaning safety system including example frequencies of operation of a sound device, according to examples of the present disclosure.

FIG. 2 is an illustration of operation of an apparatus to control operation of an example self-cleaning safety system including example frequencies of operation of a sound device, according to examples of the present disclosure. Specifically, FIG. 2 may illustrate operation of apparatus 100. Audio device 108 may be controlled by apparatus 100 to vibrate or issue sound waves at an inaudible frequency. FIG. 2 illustrates example frequencies of such vibrations or sound waves. For example, audio device 108 may vibrate or issue sound waves at an inaudible frequency within a range of frequencies less than an audible frequency range, such as less than 20 Hz, such as at 18 Hz, shown at (A). In another example, audio device 108 may vibrate or issue sound waves at an inaudible frequency within a range of frequencies greater than an audible frequency range, such as more than 20 KHz, such as at 22 KHz.

Figure 3:
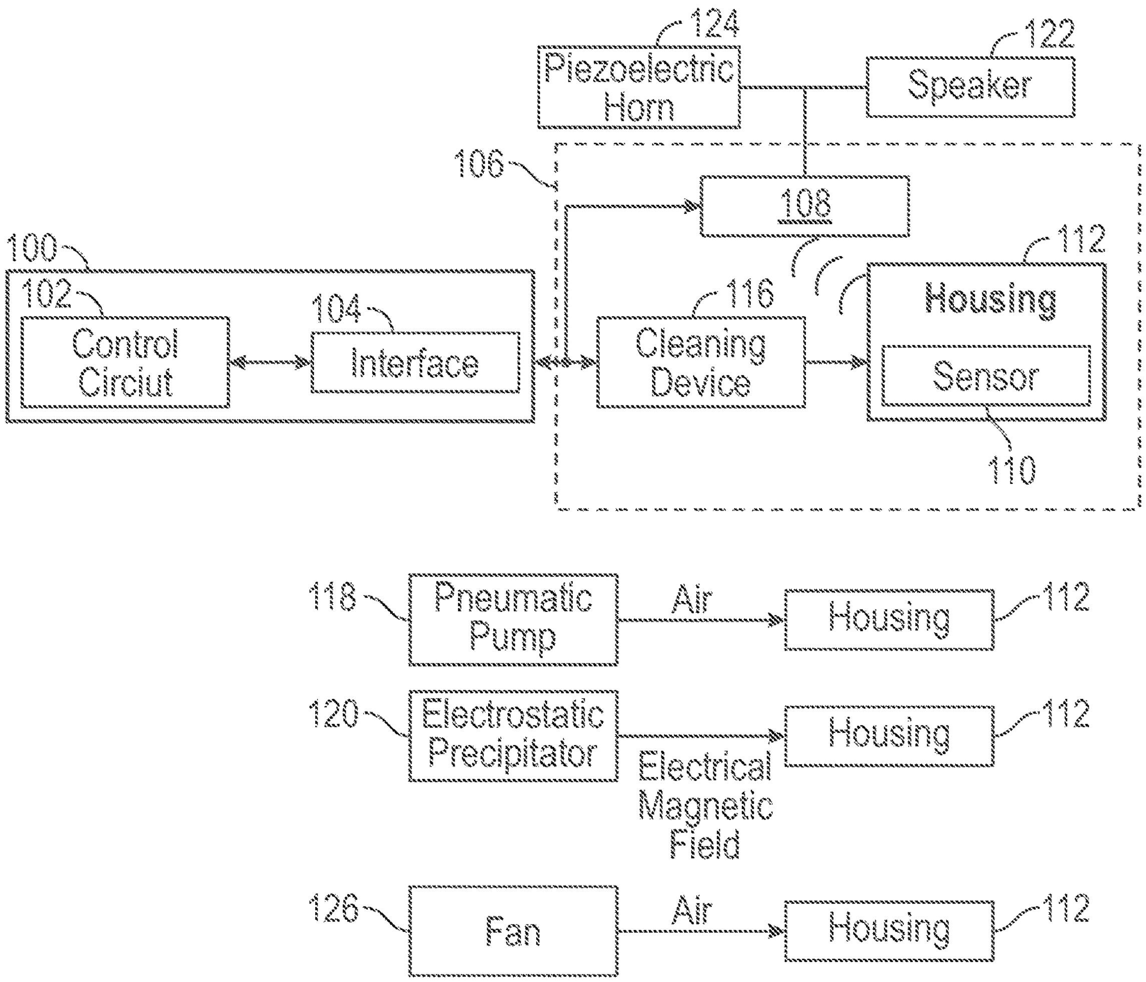
FIG. 3 is a more detailed illustration of an apparatus to control operation of an example self-cleaning safety system, according to examples of the present disclosure.

FIG. 3 is a more detailed illustration of an apparatus to control operation of an example self-cleaning life safety system, according to examples of the present disclosure. Specifically, FIG. 3 may illustrate a more detailed view of apparatus 100 and self-cleaning safety system 106.

Apparatus 100 may control any suitable number and kind of additional cleaning devices 116. Cleaning devices 116 may be operated in conjunction with operation of audio device 108 in a cleaning mode. Cleaning device 116 may be implemented in any suitable manner. Cleaning device 116 could be turned on by control circuit 102 during a cleaning mode of self-cleaning safety device 106, and then turned off during a normal mode of self-cleaning safety device 106, so as to not interfere with detection of hazardous conditions by self-cleaning safety device 106.

In one example, an electrostatic precipitator 120 may implement cleaning device 116. Electrostatic precipitator 120 may be configured to collect dust on a plate that was attached to but outside safety system housing 112 or another suitable part of self-cleaning system 106, allowing for easier cleaning. Electrostatic precipitator 120 may generate an electrical magnetic field around portions of safety system housing 112 to collect dust or other debris.

In one example, a pneumatic pump 118 may implement cleaning device 116. Pneumatic pump 118 may be configured to fill an air chamber (not shown) that could then be quickly exhausted or emptied with a quick release valve (not shown) to blow pressurized air out which would remove dust and debris from safety system housing 112.

In one example, a motor-powered fan 126 may implement cleaning device 116. Motor-powered fan 126 may be placed anywhere in self-cleaning safety system 106 to blow dust and debris off safety system housing 112.

In one example, a piezoelectric horn 124 may implement audio device 108. In another example, a speaker 122 may implement audio device 108.

Cleaning device 116 may be turned on by control circuit 102 in any suitable cleaning mode, with the same or different periodicity than the operation of audio device 108 in a cleaning mode. Cleaning device 116 may be activated, for example, every tenth cleaning cycle, i.e. every tenth time that audio device 108 is run in cleaning mode.

Figure 4:
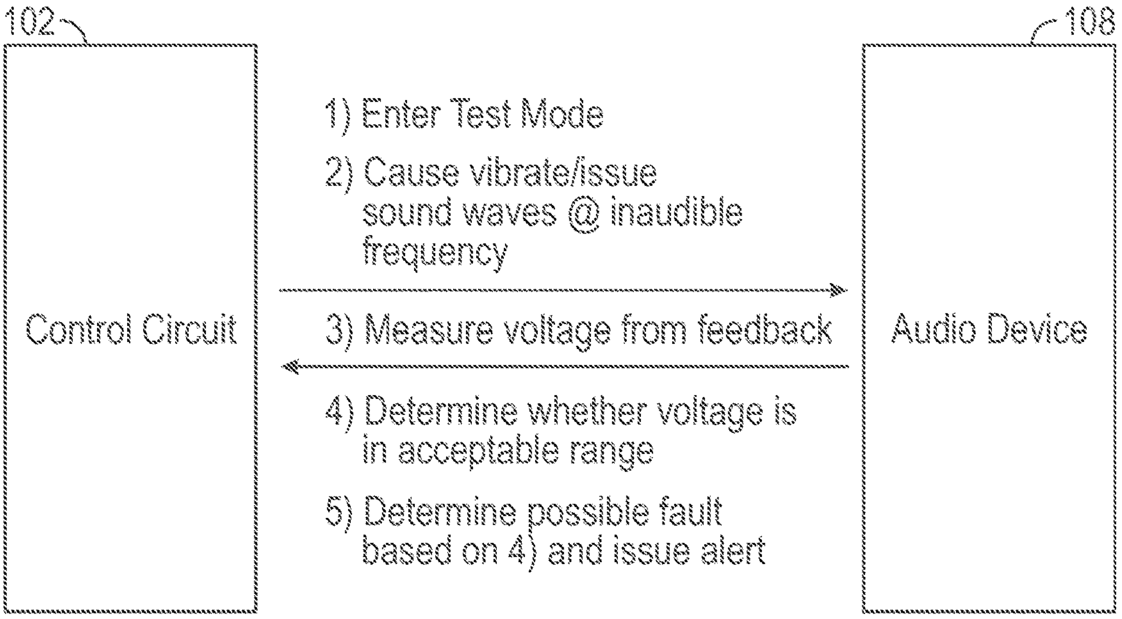
FIG. 4 is a more detailed illustration of operation of an apparatus to control operation of an example self-cleaning safety system, according to examples of the present disclosure.

FIG. 4 is a more detailed illustration of operation of an apparatus to control operation of an example self-cleaning life safety system, according to examples of the present disclosure. In particular, FIG. 4 illustrates operation of control circuit 102 upon audio device 108. Moreover, the operation upon audio device 108 may also be performed upon additional cleaning device 116 (not shown).

At (1), control circuit 102 may determine to enter into a test mode of audio device 108. The test mode may include any suitable cleaning mode as discussed above. That is, the test mode and cleaning mode may be performed together.

At (2), control circuit 102 may cause audio device 108 to vibrate or issue sound waves at an inaudible frequency.

At (3), control circuit 102 may receive or measure voltage from feedback from audio device 108.

At (4), control circuit 102 may determine whether the voltage from feedback from audio device 108 is within an acceptable range.

At (5), control circuit 102 may determine a possible fault of audio device 108 based upon the determination in (4) and issue an alert.

Figure 5:
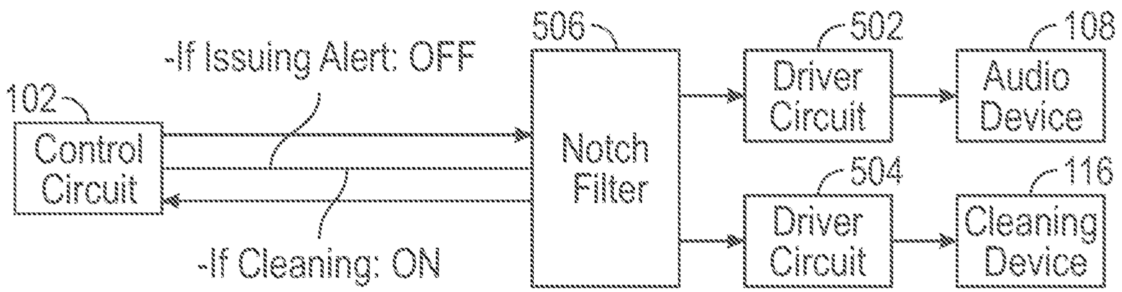
FIG. 5 is a more detailed illustration of operation of an apparatus to control operation of an example self-cleaning safety system through control of a notch filter, according to examples of the present disclosure.

FIG. 5 is a more detailed illustration of operation of an apparatus to control operation of an example self-cleaning safety system to vibrate or issue sound waves at an inaudible frequency through control of a notch filter, according to examples of the present disclosure.

Control circuit 102 may utilize one or more driver circuits to drive audio device 108 or cleaning device 116. Such driver circuits may be implemented in any suitable manner, such as by an ASIC, FPGA, PLD, reprogrammable logic or hardware, analog circuitry, digital circuitry, digital logic, microcontroller, instructions for execution by a processor, or any suitable combination thereof. Such driver circuits may be configured to perform any suitable signal conditioning upon control signals issued by control circuit 102 so that such control signals may effect control upon audio device 108 or cleaning device 116. Such driver circuits may be implemented in any suitable location, such as within apparatus 100 or self-cleaning safety system 106. A single driver circuit may be used for both audio device 108 and cleaning device 116, or, as shown in the example of FIG. 5, separate driver circuits 502, 504 may be used for audio device 108 and cleaning device 116, respectively.

A notch filter 506 may be placed on any control lines between control circuit 102 and audio device 108 and cleaning device 116. For example, notch filter 506 may be placed between control circuit 102 and driver circuits 502, 504. Notch filter 506 may be implemented in any suitable manner, such as by an ASIC, FPGA, PLD, reprogrammable logic or hardware, analog circuitry, digital circuitry, digital logic, instructions for execution by a processor, or any suitable combination thereof.

Notch filter 506 may be activated by control circuit 102 when self-cleaning safety system 106 is in a cleaning mode, and may be deactivated by control circuit 102 when self-cleaning safety system 106 is in a normal mode. Notch filter 506 may allow audio device 108 or cleaning device 116 to only operate at the frequencies of interest, i.e. inaudible frequency or frequencies. For example, piezoelectric horns may resonate at other audible peaks that waste energy and produce audible sounds.

Figure 6:
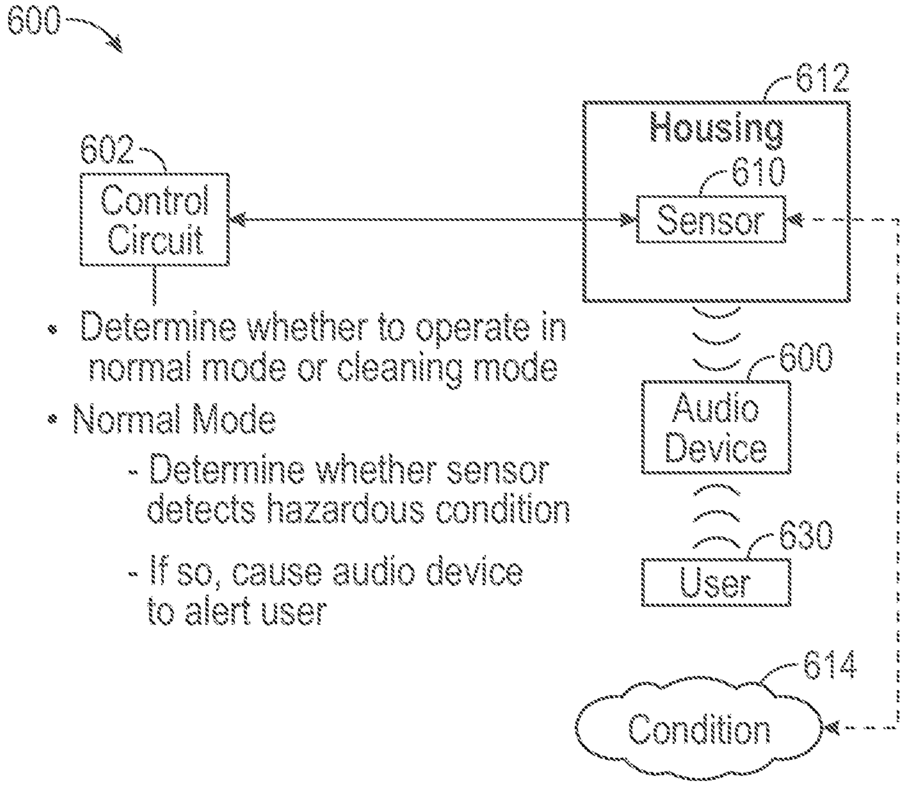
FIG. 6 is an illustration of an example self-cleaning safety system, according to examples of the present disclosure.

FIG. 6 is an illustration of an example self-cleaning safety apparatus 600, according to examples of the present disclosure. Apparatus 600 may implement portions of FIGS. 1-5. Apparatus 600 may include a sensor 610 to detect a hazardous condition 614. Apparatus 600 may include an audio device 608 to alert a user 630 of hazardous condition 614. Apparatus 600 may include a safety system housing 612 to house sensor 610. Apparatus 600 may include a control circuit 602 to determine whether to operate apparatus 600 in a cleaning mode or in a normal mode. Control circuit 602 may be configured to, based on a determination to operate apparatus 600 in the normal mode, determine whether sensor 610 has detected hazardous condition 614. Control circuit 602 may be configured to, based on a determination that sensor 610 has detected hazardous condition 614, cause audio device 608 to alert user 630 of hazardous condition 614, by driving audio device 608 to vibrate or issue sound waves at an audible frequency. Control circuit 602 may be configured to, based on a determination to operate apparatus 600 in the cleaning mode, cause a cleaning of safety system housing 612 by causing audio device 608 to vibrate or issue sound waves at an inaudible frequency.

Control circuit 602 may be implemented as described above with respect to control circuit 102. Safety system housing 612 may be implemented as described above with respect to safety system housing 112. Sensor 610 may be implemented as described above with respect to sensor 110. Audio device 608 may be implemented as described above with respect to audio device 108. Condition 614 may be as described above with respect to condition 114. User 630 may be any suitable user of apparatus 600. Apparatus 600 may be implemented as described above with respect to system 106.

Moreover, as shown in FIG. 2 with respect to control circuit 102, control circuit 602 may be configured to, based on the determination to operate apparatus 600 in the cleaning mode, cause audio device 608 to vibrate or issue sound waves at the inaudible frequency by causing audio device 608 to vibrate or issue sound waves at a frequency higher than a range of audible frequencies, or at a frequency lower than a range of audible frequencies, or both.

Figure 7:
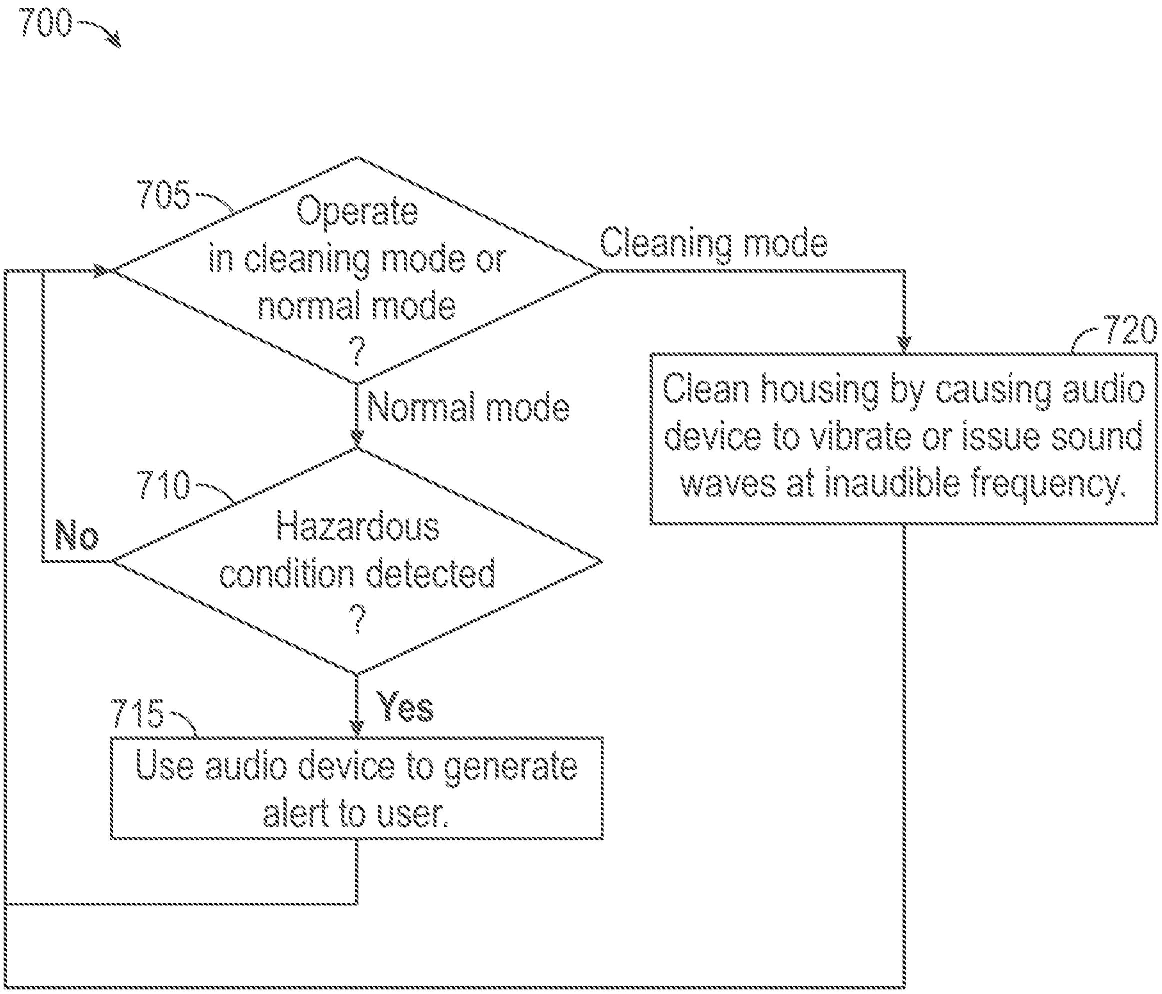
FIG. 7 is an illustration of an example method of operating a self-cleaning safety system, according to examples of the present disclosure.

FIG. 7 is an illustration of an example method 700 of operating a self-cleaning safety system, according to examples of the present disclosure. Method 700 may be performed by any suitable elements, such as those of control circuits as shown in FIGS. 1-6. Method 700 may be executed with more or fewer steps than shown in FIG. 7, and the steps of method 700 may be optionally omitted, repeated, performed in a different order, performed in parallel, or recursively.

At 705, it may be determined whether to operate an apparatus in a cleaning mode or in a normal mode. If the apparatus is to be operated in the normal mode, method 700 may proceed to 710. Otherwise, method 700 may proceed to 720.

At 710, based on a determination to operate the apparatus in the normal mode, it may be determined whether a sensor of the apparatus has detected a hazardous condition. If a hazardous condition has been detected, method 700 may proceed to 715. Otherwise, method 700 may return to 705.

At 715, based on a determination that the sensor has detected the hazardous condition, an audio device of the apparatus may be caused to alert a user of the hazardous condition. The alert may be audible. The alert may be generated by an audio device such as a piezoelectric horn or a speaker vibrating or issuing sound waves in one or more audible frequencies. Method 700 may return to 705.

At 720, based on a determination to operate the apparatus in the cleaning mode, a cleaning of a housing of the sensor may be caused by causing the audio device to vibrate or issue sound waves at an inaudible frequency. Method 700 may return to 705.

Figure 8:
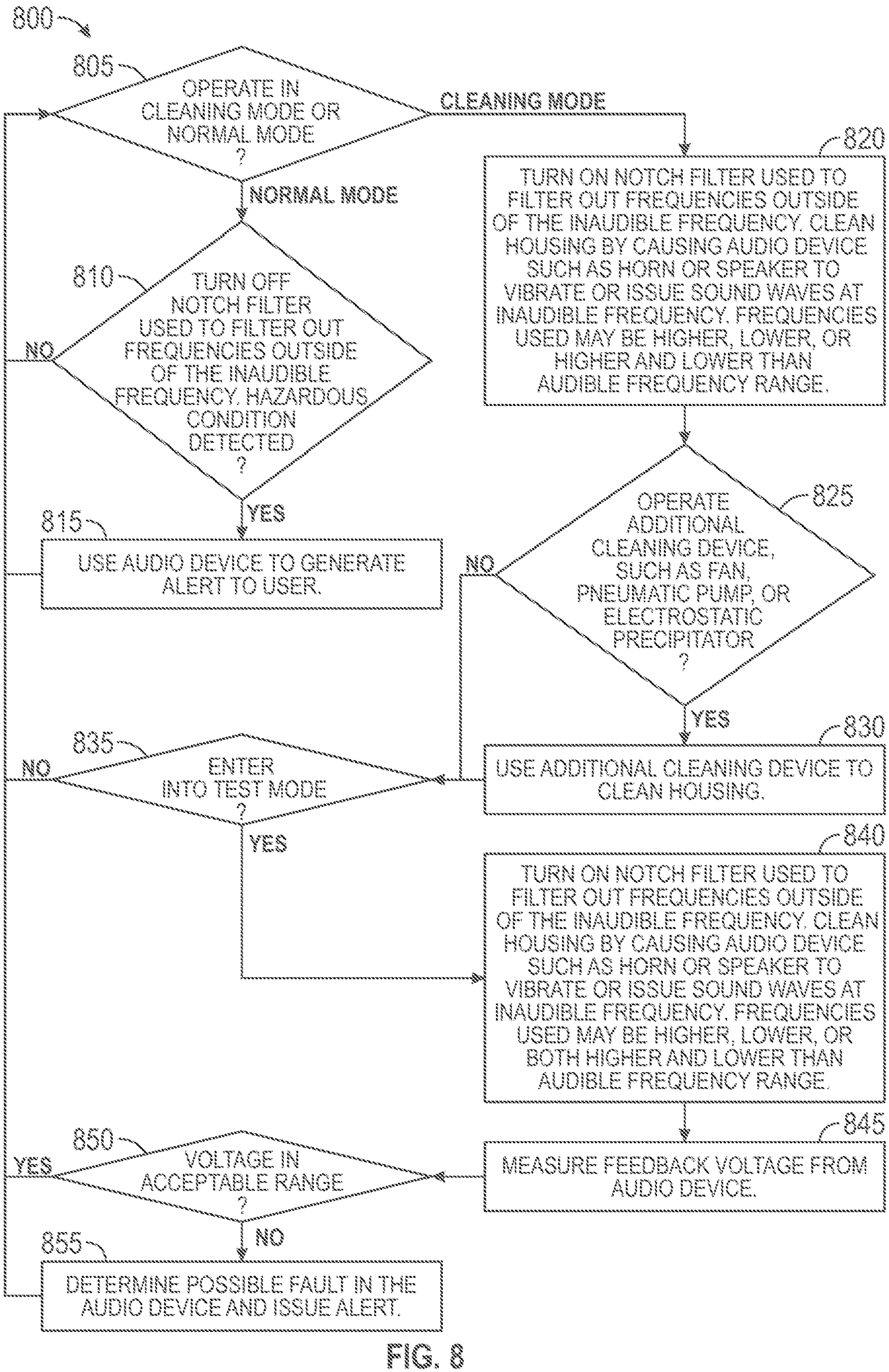
FIG. 8 is an illustration of another example method of operating a self-cleaning safety system, according to examples of the present disclosure.

FIG. 8 is an illustration of an example method 800 of operating a self-cleaning safety system, according to examples of the present disclosure. Method 800 may be performed by any suitable elements, such as those of control circuits as shown in FIGS. 1-6. Method 800 may be executed with more or fewer steps than shown in FIG. 8, and the steps of method 800 may be optionally omitted, repeated, performed in a different order, performed in parallel, or recursively.

At 805, it may be determined whether to operate an apparatus in a cleaning mode or in a normal mode. If the apparatus is to be operated in the normal mode, method 800 may proceed to 810. Otherwise, method 800 may proceed to 820.

At 810, based on a determination to operate the apparatus in the normal mode, a notch filter used to filter out frequencies outside of the inaudible frequency may be turned off. It may be determined whether a sensor of the apparatus has detected a hazardous condition. If a hazardous condition has been detected, method 800 may proceed to 815. Otherwise, method 800 may return to 805.

At 815, based on a determination that the sensor has detected the hazardous condition, an audio device of the apparatus may be caused to alert a user of the hazardous condition. The alert may be audible. The alert may be generated by an audio device such as a piezoelectric horn or a speaker vibrating or issuing sound waves in one or more audible frequencies. Method 800 may return to 805.

At 820, based on a determination to operate the apparatus in the cleaning mode, a notch filter to filter out frequencies outside of the inaudible frequency may be turned on. A cleaning of a housing of the sensor may be caused by causing the audio device to vibrate or issue sound waves at an inaudible frequency. The audio device may be caused to vibrate or issue sound waves at a frequency higher than a range of audible frequencies, lower than the range of audible frequencies, or higher and lower than the range of audible frequencies. The audio device may be the same audio device that was used to alert a user in 815. The audio device may be a piezoelectric horn or a speaker, for example.

At 825, it may be determined whether an additional cleaning device will be used to clean the housing. If so, method 800 may proceed to 830. Otherwise, method 800 may proceed to 835.

At 830, based on the determination to operate the apparatus in the cleaning mode and to use an additional cleaning device, the additional cleaning device may be caused to clean the sensor. The additional cleaning device may include, for example, an electrostatic precipitator, pneumatic pump, or fan. Method 800 may proceed to 835.

At 835, it may be determined whether a test mode is to be entered into in conjunction with the cleaning mode. If so, method 800 may proceed to 840. Otherwise, method 800 may return to 805.

At 840, the audio device may be caused to vibrate or issue sound waves at the inaudible frequency. This may be a same or a different option as performed in 820, i.e. a notch filter to filter out frequencies outside of the inaudible frequency may be turned on.

At 845, feedback from the audio device may be measured. The feedback may result from causing the audio device to vibrate or issue sound waves at the inaudible frequency.

At 850, it may be determined whether the voltage is in an acceptable range. If so, method 800 may return to 805. Otherwise, method 800 may proceed to 855.

At 855, based upon a determination that the voltage is not within the acceptable range, a possible fault in the audio device may be determined and an alert issued. Method 800 may return to 805.

Examples of the present disclosure may include an apparatus.

The apparatus may include a control circuit. The control circuit may be implemented in any suitable manner, such as by an application specific integrated circuit, field programmable gate array, programmable logic device, reprogrammable logic or hardware, analog circuitry, digital circuitry, digital logic, microcontroller, or instructions for execution by a processor, or any suitable combination thereof.

The control circuit may be configured to connect to an audio device of a safety system. The safety system may include any suitable safety system, such as a smoke detector, carbon monoxide (CO) detector, radon detector, heat detector, or any suitable combination thereof.

The audio device may be implemented in any suitable manner, such as by a speaker, horn, alarm, or piezoelectric horn or device. The audio device may be configured to oscillate at an audible frequency to alert one or more users. Furthermore, the audio device may be configured to generate sound waves at an audible frequency to alert one or more users.

The safety system may include a sensor to sense the hazardous condition. The sensor may be implemented in any suitable manner and may be configured to detect any suitable physical phenomena or condition such as smoke, heat, CO, or radon, and may provide any suitable signal to a monitor circuit to indicate a level of physical phenomena or condition detected by the sensor.

The apparatus may include an interface to connect the control circuit to the audio device. The interface may include any suitable mechanism by which the control circuit may access elements of the safety system, such as pins, wires, busses, vias, electrical pathways, or any other suitable mechanism for transferring signals.

The control circuit may be configured to determine whether to clean a housing of the sensor, and, based on a determination to clean the housing of sensor, cause the audio device to vibrate or issue sound waves at an inaudible frequency.

In combination with any of the above examples, the control circuit may be configured to, based on the determination to clean the housing of the sensor, cause the audio device to vibrate or issue sound waves at the inaudible frequency by causing the audio device to vibrate or issue sound waves at a frequency higher than a range of audible frequencies.

In combination with any of the above examples, the control circuit may be configured to, based on the determination to clean the housing of the sensor, cause the audio device to vibrate or issue sound waves at the inaudible frequency by causing the audio device to vibrate or issue sound waves at a frequency lower than a range of audible frequencies.

In combination with any of the above examples, the control circuit may be configured to, based on the determination to clean the housing of the sensor, cause the audio device to vibrate or issue sound waves at the inaudible frequency by causing the audio device to vibrate or issue sound waves at a first frequency higher than a range of audible frequencies and at a second frequency lower than the range of audible frequencies.

In combination with any of the above examples, the control circuit may be configured to, based on the determination to clean the housing of the sensor, cause an additional cleaning device to clean the housing of the sensor.

In combination with any of the above examples, the additional cleaning device may be an electrostatic precipitator to clean the housing of the sensor.

In combination with any of the above examples, the additional cleaning device may be a pneumatic pump to clean the housing of the sensor.

In combination with any of the above examples, the additional cleaning device may be a fan to clean the housing of the sensor.

In combination with any of the above examples, the audio device may be a horn or speaker.

In combination with any of the above examples, the control circuit may be configured to, in a test mode, cause the audio device to vibrate or issue sound waves at the inaudible frequency on a periodic basis, measure voltage from feedback from the audio device resulting from causing the audio device to vibrate or issue sound waves at the inaudible frequency, determine whether the voltage is in an acceptable range, and, based upon a determination that the voltage is not within the acceptable range, determine a possible fault in the audio device and issue an alert.

In combination with any of the above examples, the control circuit may be configured to control a notch filter to filter out frequencies outside of the inaudible frequency, including to turn off the notch filter when the audio device is issuing the alert to the user about the hazardous condition and to turn on the notch filter when causing the audio device to clean the housing.

Examples of the present disclosure may include an apparatus. The apparatus may include any of the apparatuses of the above examples, including the control circuits therein. The apparatus may include the sensor, the audio device, and the housing.

Examples of the present disclosure may include methods performed by any of the above examples.

Although example examples have been described above, other variations and examples may be made from this disclosure without departing from the spirit and scope of these examples.

What is claimed is:

1. An apparatus, comprising:

a control circuit to connect to an audio device of a safety system, the safety system to detect a hazardous condition, the audio device to alert a user of the hazardous condition, the safety system to include a sensor to sense the hazardous condition; and an interface to connect the control circuit to the audio device;

wherein the control circuit is to:

determine whether to clean a housing of the sensor;

based on a determination to clean the housing of the sensor, cause the audio device to vibrate or issue sound waves at a frequency; and control a notch filter to filter out frequencies outside of the frequency, including to turn off the notch filter when the audio device is issuing the alert to the user about the hazardous condition and to turn on the notch filter when causing the audio device to clean the housing.

2. The apparatus of claim 1, wherein the control circuit is to, based on the determination to clean the housing of the sensor, cause the audio device to vibrate or issue the sound waves at the frequency by causing the audio device to vibrate or issue the sound waves at a frequency higher than a range of audible frequencies.

3. The apparatus of claim 1, wherein the control circuit is to, based on the determination to clean the housing of the sensor, cause the audio device to vibrate or issue the sound waves at the frequency by causing the audio device to vibrate or issue the sound waves at a frequency lower than a range of audible frequencies.

4. The apparatus of claim 1, wherein the control circuit is to, based on the determination to clean the housing of the sensor, cause an additional cleaning device to clean the housing of the sensor.

5. An apparatus, comprising:

a control circuit to connect to an audio device of a safety system, the safety system to detect a hazardous condition, the audio device to alert a user of the hazardous condition, the safety system to include a sensor to sense the hazardous condition; and an interface to connect the control circuit to the audio device;

wherein the control circuit is to:

determine whether to clean a housing of the sensor; and based on a determination to clean the housing of the sensor, cause:

the audio device to vibrate or issue sound waves at a frequency; and an additional cleaning device to clean the housing of the sensor, wherein the additional cleaning device is an electrostatic precipitator to clean the housing of the sensor.

6. The apparatus of claim 1, wherein the audio device is a horn or speaker.

7. The apparatus of claim 1, wherein the control circuit is to, in a test mode:

cause the audio device to vibrate or issue the sound waves at the frequency on a periodic basis;

measure voltage from feedback from the audio device resulting from causing the audio device to vibrate or issue sound waves at the frequency;

determine whether the voltage is in an acceptable range; and based upon a determination that the voltage is not within the acceptable range, determine a possible fault in the audio device and issue an alert.

8. The apparatus of claim 1, wherein the frequency produces an audible sound to users.

9. The apparatus of claim 1, wherein the frequency produces a sound at 65 to 120 decibels (dB) when measured at a distance of 10 feet from the audio device.

10. The apparatus of claim 1, wherein the control circuit is to indicate an alarm fault condition.

11. The apparatus of claim 1, wherein the control circuit is to indicate a need for testing.

12. The apparatus of claim 1, wherein the safety system is to detect a hazardous condition selected from smoke, heat, carbon monoxide (CO), and radon.

13. The apparatus of claim 1, wherein the interface to connect the control circuit to the audio device includes one of pins, wires, busses, vias, and electrical pathways.

14. The apparatus of claim 1, wherein the control circuit is to operate a test mode to cause the audio device to vibrate or issue the sound waves at the frequency on a periodic basis.

15. The apparatus of claim 1, wherein the control circuit is to operate a test mode to measure voltage from feedback from the audio device resulting from causing the audio device to vibrate or issue the sound waves at the frequency.

16. The apparatus of claim 1, wherein the control circuit is to operate a test mode to:

determine that the voltage is not in an acceptable range; and based upon determining that the voltage is not within the acceptable range, determine a possible fault in the audio device and issue an alert.

17. The apparatus of claim 4, wherein the additional cleaning device is a pneumatic pump to clean the housing of the sensor.

18. The apparatus of claim 4, wherein the additional cleaning device is a fan to clean the housing of the sensor.

19. The apparatus of claim 5, wherein the control circuit is to indicate an alarm fault condition.

20. The apparatus of claim 5, wherein the safety system is to detect a hazardous condition selected from smoke, heat, carbon monoxide (CO), and radon.

* * * * *